United States Patent [19]
Klein et al.

[11] Patent Number: 4,720,176
[45] Date of Patent: Jan. 19, 1988

[54] ERASE BEAM APPARATUS AND METHOD FOR SPATIAL INTENSITY THRESHOLD DETECTION

[75] Inventors: Marvin B. Klein, Malibu; Gilmore J. Dunning, Newbury Park; George C. Valley, Los Angeles, all of Calif.

[73] Assignee: Hughes Aircraft Company, Los Angeles, Calif.

[21] Appl. No.: 865,212

[22] Filed: May 20, 1986

[51] Int. Cl.$^4$ ............................ G02B 5/23; G02F 1/01
[52] U.S. Cl. ................................... 350/353; 350/354; 372/21; 372/99; 332/7.51
[58] Field of Search ...................... 350/354, 353, 393; 372/21, 99, 9, 19; 332/7.51

[56] References Cited

PUBLICATIONS

C. R. Giuliano et al., "Can Phase Conjugate Resonators Enhance Laser Performance?", Laser Focus, Feb. 1983, pp. 55-64.
J. P. Huignard et al., "Wave Mixing in Photorefractive Bismuth Silicon Oxide Crystals and its Applications", Optical Engineering, vol. 24, No. 4, Jul./Aug. 1985, pp. 586-592.
Amos Hardy, "Sensitivity of Phase-Conjugate Resonators to Intracavity Phase Perturbations", IEEE Journal of Quantum Electronics, vol. QE-17, No. 8, Aug. 1981, pp. 1581-1585.
P. A. Balanger, "Phase Conjugation and Optical Resonators", Optical Engineering, vol. 21, No. 2, Mar./Apr. 1982, pp. 266-270.
J. Auyeung et al., "A Theoretical and Experimental Investigation of the Modes of Optical Resonators with Phase-Conjugate Mirrors," IEEE J. of Quantum Electronics, vol. QE-15, No. 10, Oct. 1979, pp. 1180-1188.
H. Rajbenbach et al., "Self-Induced Coherent Oscillations with Photorefractive $Bi_{12}SiO_{20}$ Amplifier", Optics Letters, Mar. 1985, vol. 10, No. 3, pp. 137-139.
A. Yariv, "Phase Conjugate Optics and Real-Time Holography", IEEE Journal of Quantum Electronics, vol. QE-14, No. 9, Sep. 1978.
A. E. Siegman et al., "Optical Resonators Using Phase Conjugate Mirrors", Optical Phase Conjugation, R. A. Fisher, Ed., (Academic Press, N.Y. 1983).
D. Psaltis et al., "Photorefractive Incoherent-to-Coherent Optical Conversion", SPIE, vol. 465, 1984, pp. 2 thru 8.
A. A. Kamshilin et al., "Holographic Image Conversion in a $Bi_{12}SiO_{20}$ Crystal", Sov. Tech. Phys. Lett. 6(3), Mar. 1980, pp. 144 & 145.
J. Feinberg et al., "Phase-Conjugating Mirror with Continuous-Wave Gain", Optics Letters, vol. 5, No. 12, Dec. 1980, pp. 519-521.

*Primary Examiner*—Eugene R. LaRoche
*Assistant Examiner*—Michael Shingleton
*Attorney, Agent, or Firm*—V. D. Duraiswamy; V. G. Laslo; A. W. Karambelas

[57] ABSTRACT

A phase conjugate resonator (PCR) (2) employing a phase conjugate mirror (PCM) (4) provides high resolution spatial detection of individual locations in a two-dimensional optical array which exceed or fall below a threshold level. The optical intensity profile under investigation is imposed onto an input erase beam (18) to the PCM (4). The erase beam (18) is directed parallel to the PCR axis (16), thereby preventing walkoff. The PCR (2) oscillates at those locations where the erase beam's optical intensity is below a threshold level. The spatially modulated optical output may be read out with multiple detectors or an imaging system, or the cumulative area output of the PCR can be read out with a single detector (28) to characterize the intensity profile relative to the threshold.

18 Claims, 4 Drawing Figures

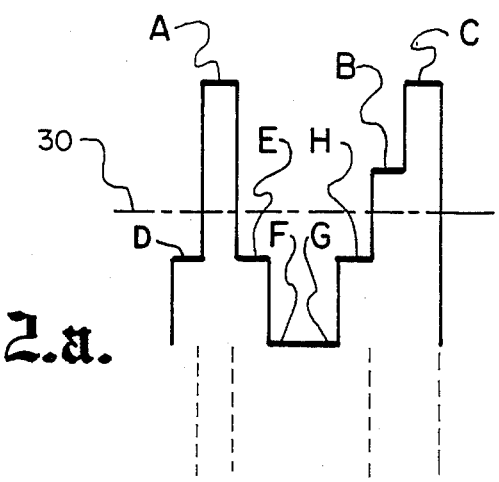
Fig.2.a.
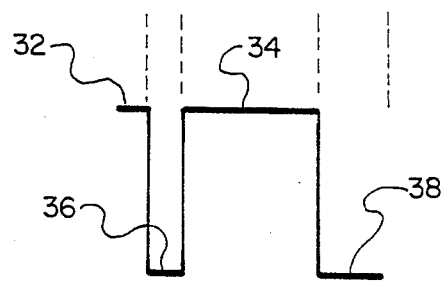
Fig.2.b.
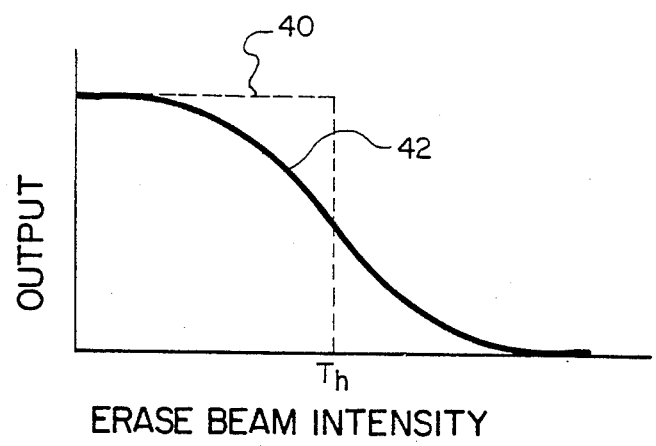
Fig.3.

ERASE BEAM APPARATUS AND METHOD FOR SPATIAL INTENSITY THRESHOLD DETECTION

ORIGIN OF THE INVENTION

The U.S. Government has rights in this invention under Contract No. MDA904-83-C-9463. This application is related to co-pending application Ser. No. 864,937, filed May 20, 1986 concurrently with this application by Thomas R. O'Meara and Richard C. Lind and assigned to Hughes Aircraft Company, the assignee of this invention.

BACKGROUND OF THE INVENTION

1. Field of the Invention

This invention relates to devices and methods used to detect the locations at which the intensity of an optical image exceeds a threshold level, and more particularly to phase conjugate resonators employed in optical data processing.

2. Description of the Prior Art

There are many signal processing applications which require the processing of electrical data at a very high rate. The use of optics for these applications is very appealing because of the massive parallelism that can be obtained, i.e., a large amount of information can be processed using a single beam. One application of particular interest is the processing and detection of electronic signals by electro-optic correlation techniques. In these and various other applications it is desirable to employ a binary or threshold type of detection scheme which is sensitive to the optical signal at many different locations in the beam. The object is to detect whether the beam's optical intensity at one or more locations exceeds or falls below a threshold level, rather than to determine the absolute magnitude of the beam intensity at such locations.

For example, one may detect the occurrence of a particular alpha-numeric character by optically correlating a candidate character or a field of characters with every possible character, either in sequence or in parallel. The desired character will produce the highest correlation peak in the output of an optical correlator. In searching over a field of multiple correlations the identification of normalized intensity peaks greater than a specified value thus identifies the character.

The intensity of a correlation peak could be simply detected with an optical detector and fed into an electronic threshold detector whose activated output then identifies a detection event. Unfortunately, neither the expected position of the character nor its associated correlation peak is generally known. Accordingly, a very large number of optical detectors, perhaps numbering in the tens of thousands, might be required to cover the entire field of possible positions. Each of the detectors must have fast temporal responses, especially if the occurrence event is short-lived. Furthermore, all of the detectors must have individual threshold circuits, since in general each detector produces a spurious output. Such outputs occur even with "noise-free" detectors, since large numbers of detectors typically see strong cross-correlation peaks which, though individually falling well below threshold, may in their total output exceed the threshold level (assuming the detector outputs are accumulated by summing over blocks of the outputs). Thus, one conventional approach is to use a large number of individual threshold circuits, one per detector.

At present, the detection of processed images is done with a fast detector array, such as a fast television camera, and complicated electronics are used to average over a set number of frames and compare the intensity to a pre-set threshold value. The equipment required to accomplish this function is complex, expensive and space consuming.

SUMMARY OF THE INVENTION

The principal object of the present invention is the accomplishment of spatial threshold detection by purely optical means, requiring only a single detector to determine whether one or more spatially distributed optical threshold events have occurred.

Another object of the invention is the achievement of optical image processing to enhance the portions of an image having an intensity below a given threshold, and to reduce or entirely eliminate all other image elements.

Another object is the provision of an effective memory device capable of retaining high resolution, spatially distributed optical information for relatively long periods of time.

A further object is the achievement of a very low noise optical threshold detector for a large number of spatially distributed optical signals.

These objects are accomplished by employing a phase conjugate resonator (PCR) to perform spatial optical threshold detection. A spatial intensity pattern is imposed on an input erase beam to the PCR, which is comprised of a phase conjugate mirror (PCM), another mirror optically opposed to the PCM, and an oscillation cavity between the two, possibly containing an active gain medium. The PCR is required to have a gain greater than unity in the absence of an erase beam, and its PCM is a conjugating medium whose spatial reflectivity decreases with increasing erase beam intensity. The PCM is adapted to receive the erase beam and interacts with the other elements of the PCR to produce a high intensity optical output from the PCR at locations corresponding to the locations of the erase beam which have optical intensities below a threshold level. The PCR produces a very low level (ideally zero) output at locations corresponding to the input beam locations at which the optical intensity is above the threshold level. An output optical detector is positioned to sense and obtain threshold event information from the PCR output.

The PCM may be degenerate four-wave mixing device, in which case the erase beam is non-interfering with the pump beams, its power is in the same order of magnitude as the pump beams, and it is directed generally parallel to the PCR axis at an optimum angle to the pump beams. The PCM has a reflectivity greater than unity, and/or a gain medium is added to the oscillation cavity to bring the PCR gain above unity. The output detector may be designed to sense either the spatially resolved optical output from the PCR, or the cumulative area output. The detector retains its output for an appreciable period of time after the spatial modulation has been removed from the erase beam, and thus can function as an effective memory device.

These and other features and advantages of the invention will be apparent to those skilled in the art from the following detailed description of preferred embodiments, taken together with the accompanying drawings, in which:

DESCRIPTION OF THE DRAWINGS

FIGS. 2a and 2b are illustrative diagrams showing an erase beam optical intensity pattern for the embodiment of FIG. 1, and the resulting output pattern, respectively; and FIG. 3 is an idealized graph illustrating the output response to the erase beam optical intensity at any particular location in the erase beam for the system of FIG. 1.

DETAILED DESCRIPTION OF PREFERRED EMBODIMENTS

Figure 1:
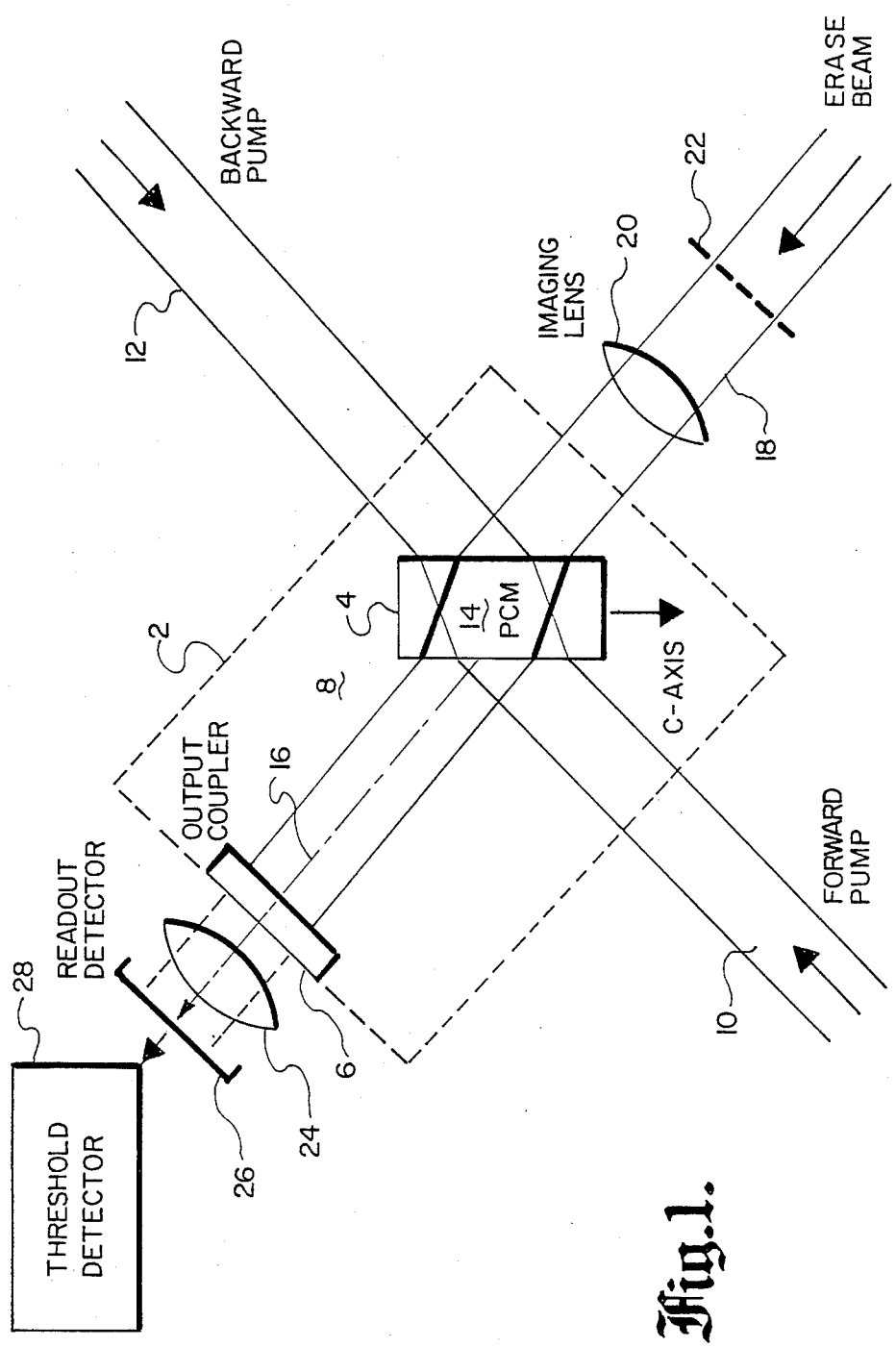
FIG. 1 is a block diagram of a preferred embodiment of the invention.

This invention results from the recognition that a PCR, if properly constructed, is capable of retaining and transferring high resolution spatial information. PCRs were developed fairly recently, and have been found to have several characteristics which differ significantly from those of conventional resonators. For example, a PCR can compensate for intracavity distortions and thus extract energy effectively in situations where conventional resonators require an unstable resonator design, and with an "ideal" PCM will not have longitudinal modes that depend on cavity length. PCR technology and operating characteristics are discussed in a paper by C. R. Giuliano, R. C. Lind, T. R. O'Meara and G. C. Valley, "Can Phase Conjugate Resonators Enhance Laser Performance?", Laser Focus, February, 1983, pages 55–64; and also in a paper by A. E. Siegman, P. A. Belanger and A. Hardy, "Optical Resonators Using Phase Conjugate Mirrors", Optical Phase Conjugation, R. A. Fisher, Ed. (Academic Press, N.Y. 1983).

The threshold detector of the present invention makes use of unique properties which have been discovered for a PCR. Specifically, PCRs have been found to have a very high degree of spatial resolution. With a properly designed system, such as that illustrated herein, a PCR can be used to produce an output in which each location or pixel of the output beam has a direct relationship to the corresponding location in an input beam applied to the PCR.

In co-pending application Ser. No. 864,937, filed May 20, 1986 concurrently with this application by Thomas R. O'Meara and Richard C. Lind and assigned to Hughes Aircraft Company, the assignee of the present invention, the contents of which are incorporated herein by reference, embodiments are disclosed in which the intensities of one or both pump beams to a degenerate four-wave mixing PCM are spatially modulated with an optical intensity pattern. The PCM forms part of a PCR which oscillates in a spatial pattern corresponding to the modulation pattern, such that local oscillations are established at locations corresponding to the locations in the modulated pump beams where the optical intensity exceeds a threshold level. In this way the PCR forms a spatial threshold detector.

While the devices disclosed in the O'Meara et al. patent application provide a spatial array of outputs, they do not produce optimum resolution. This is because of a "walkoff" problem that occurs when the pump beams are not collinear with the resonator axis. With the O'Meara et al. embodiments, in which the optical intensity pattern is encoded onto one or both of the pump beams, the pump beams are directed at an angle to the resonator axis. This in effect causes each pixel area of the resonating beam, which oscillates generally parallel to the resonator axis, to see a partial "side view" of the beam which bears the spatial intensity information. The result is a larger effective pixel than would be the case if the information beam could be viewed parallel to its axis, with each pixel appearing as a small point.

The present invention is directed to an improvement that solves the "walkoff" problem. In this improvement the spatial intensity information is imposed upon an input erase beam which is collinear with the PCR axis. The spatial intensity pattern may be imposed upon the erase beam either by providing the beam as the direct output of an optical transmission device having the intensity pattern of interest, or by spatially modulating a uniform beam with a mask or other spatial light modulating device.

A block diagram of a system which employs a PCR as part of a spatial intensity threshold detector is shown in FIG. 1. The PCR, indicated by dash lines 2, consists of a phase conjugate mirror (PCM) 4, an output coupler 6 in the form of a mirror which is positioned opposite the PCM, and an oscillation cavity 8 between the PCM and output coupler. The PCM is preferably of the degenerate four-wave mixing type, in which a pair of counterpropagating pump laser beams 10 and 12 are applied in opposite directions to an optical mixing medium 14.

Basically, a PCM produces a retro-reflection of an incident probe beam, with the phase of the reflected beam reversed from that of the incident beam. During PCM operation the probe and pump beams interfere in the non-linear mixing medium, producing an interference pattern. This pattern diffracts the pump beams, producing a signal wave which is the phase conjugate of the probe beam. In a PCR, scattered light from the pump beams in the mixing medium 14 travels across the cavity to the output coupler 6, where it is reflected back to the PCM. At the PCM the reflected scattered light is conjugated, amplified and reflected back to the output coupler; in this manner oscillation builds up along the resonator axis 16 to eventually produce a resonating beam oscillation within the cavity.

Referring to FIG. 1, the information bearing erase beam 18 is imaged by an imaging lens 20 onto the PCM 4. The counterpropagating pump beams 10, 12 are directed onto the PCM at an angle to the resonator axis which optimizes the performance of the PCM. The external pump beam angle can be calculated in a conventional manner to optimize the four-wave mixing reflectivity; it is typically in the range of 20°–40°. Since the erase beam is maintained parallel to the resonator axis, there is no walkoff problem.

To establish oscillation within the PCR, it is necessary that the PCR gain be greater than unity. This can be accomplished by either employing a PCM whose reflectivity is sufficiently greater than unity, and/or by adding a gain medium to the resonating cavity. The PCM conjugating medium 14 is preferably a photorefractive material, in which case the reflectivity is dependent upon the ratio of the pump beam intensities. Thus, the threshold level can be controlled by varying the intensity of one or the other of the two pump beams.

The beam intensity at each individual pixel location in the modulated erase beam 18 determines whether oscillation will be established within the PCR at that location. PCR oscillation at each pixel location is generally independent of the presence or absence of oscillation at adjacent locations. Thus, a spatial oscillation pattern is established within the PCR which directly corresponds to the intensity profile of the erase beam. Oscillation will be established at each pixel location for which the intensity of the erase beam is less than a threshold level, whereas there will be no oscillation for pixel locations at which the intensity of the erase beam exceeds the threshold level. Thus, the oscillation pattern will represent the inverse of the erase beam spatial intensity profile referenced to the threshold level.

The PCR produces an output through output coupler 6 at each pixel location where oscillation has been established. The spatial output from output coupler 6 is used to image (by lens 24) the plane of the PCM onto a readout detector 26, which in turn provides an output to an electronic threshold detector 28. Alternatively, mirrors or beam splitters could be placed in the oscillation cavity at an angle to the oscillating beam path to provide an output by deflecting a portion of the resonating wave out of the cavity. Electronic threshold detector 28 generates a binary signal indicating the presence or absence of an optical output at each pixel location. For example, readout detector 26 could be an optical display, and threshold detector 28 a raster scanning device that converts the display array pattern to a series of binary electrical signals which indicate the presence or absence of an optical signal at each display pixel. Alternately, the detection apparatus could consist simply of a gross optical detector that accumulates the total area optical output from the PCR to indicate whether the output taken as a whole has exceeded a given threshold.

The reflectivity of the PCM 4 has been found to decrease as the intensity of the erase beam 18 increases at any particular location. Thus, no intracavity resonance will be established for pixel locations at which the erase beam intensity is above a threshold level, while a positive output will be produced at the pixel locations where the erase beam intensity is below the threshold level. The PCR output contains a reversed contrast image of the information on the erase beam with the addition of amplification and thresholding. This situation is illustrated in FIGS. 2a and 2b.

FIG. 2a shows an illustrative optical intensity pattern that could be imposed on the erase beam; the horizontal axis corresponds to distance across the beam while the vertical axis corresponds to the optical intensity at each pixel location. In practice, a much higher density of discrete optical intensities could be handled, and the pattern would be two-dimensional.

Dashed horizontal line 30 indicates the threshold oscillation level established by the intensities of the two pump beams, the construction of the PCM and the presence or absence of any gain medium or variable loss in the oscillation cavity. The erase beam optical intensity exceeds the threshold level at pixel locations A, B and C, and is less than the threshold level at the pixel locations D, E, F, G and H. As described above, optical oscillation is established for those pixel locations at which the erase beam intensity is below the threshold level. The resulting output pattern is illustrated in FIG. 2b. High intensity positive outputs 32, 34 are produced at those pixel locations at which the optical intensity is less than the threshold level, while low intensity essentially zero outputs 36, 38 result from the pixel locations at which the threshold level is exceeded.

FIG. 3 is an idealized graph of the PCR response to the optical intensity for a particular erase beam pixel. Ideally, the PCR output remains at a uniformly high level 40 as the erase beam intensity at the pixel of interest increases from zero up to the threshold level, with the output then dropping abruptly to zero as the erase beam intensity passes the threshold. In practice, the result is a more gradual transition illustrated by solid curve 42.

The PCM should normally be operated with the total pump beam power in approximately the same order of magnitude as the erase beam power. If the erase beam power exceeds the total pump beam power by too great an amount, the PCM's reflectivity will become too low for successful operation.

Various PCMs may be used, including both four-wave mixing devices and self-pumped devices. The conjugating medium is preferably a photorefractive material, although other media such as saturable absorbers might also be used. For photorefractive materials with a sufficiently high electro-optic coefficient, such as barium titanate ($BaTiO_3$) or strontium barium niobate ($Sr_{1-x}Ba_xNb_2O_6$), the PCM will have a reflectivity sufficiently larger than unity to establish oscillation within the PCR with the erase beam inactivated. Other photorefractive materials with lower electro-optic coefficients may also be used in conjunction with reflectivity enhancement techniques such as frequency shifting or the application of an AC electrical field. The frequency shift technique is disclosed in an article by H. Rajbenbach and J. P. Huignard, "Optics Letters", Vol. 10, page 137, March, 1985; the AC electric field technique is disclosed in a co-pending application by George Valley and Marvin Klein, two of the present inventors, "Self-Pumped Phase Conjugate Mirror and Method Using AC Field Enhanced Photorefractive Effect", Ser. No. 836,679, filed Mar. 5, 1986 and assigned to the assignee of the present invention. Typical materials that can be used in connection with such enhancement techniques are $Bi_{12}SiO_{20}$, $Bi_{12}GeO_{20}$, $Bi_{12}TiO_{20}$, GaAs and InP. A gain medium may also be added to the oscillation cavity to bring the PCR gain above unity if the PCM reflectivity is less than unity. The gain medium can generally be any medium suitable for establishing lasing action, such as a HeNe discharge.

Unwanted photorefractive index gratings within the PCM, i.e., interference patterns between the pump beams, and the erase beam should be avoided for successful operation of the system just described. To prevent the erase beam from writing unwanted gratings, the erase beam is made non-interfering or non-interacting with respect to the pump beams. One means of doing this is to make the erase beam incoherent with respect to the pump beam, e.g. through the use of different frequencies for the erase and pump beams, jittering the frequency, or delaying the erase beam with respect to the pumps. Another approach is to polarize the erase beam at 90° with respect to the pump beams.

The described system also functions as an effective memory device. With a relatively slow PCR response time, the spatial output pattern will persist for a period of time even after the input has been removed. The use of commercial samples of barium titanate as a conjugating medium will provide a memory of several seconds. The information on the erase beam can be deleted during the memory period by means of a shutter in the beam path, by continuing the beam but with a reduced uniform intensity, or otherwise. In this manner the device can also be used as an optical memory. On the other hand, a substantial shortening of the PCM conjugating medium's response time will produce a correspondingly faster PCR response time that could make the system adaptable for real time applications.

A specific example of the invention employed a single domain crystal of BaTiO$_3$ as the non-linear conjugating medium for the PCM, and a single longitudinal mode Argon laser with a wavelength of 5145 angstroms to produce the counter-propagating forward and backward pump beams. P-polarization of the pump beams was used to couple into the large electro-optic coefficient r$_{42}$ of the crystal. The output beam from the PCR was used to image the plane of the PCM onto detectors in the form of still camera film and a video camera. In various implementations the erase beam was generated from a spatially incoherent light source provided by an arc lamp, from the same argon laser used to produce the PCM pump beams but with its polarization rotated to s-polarization, and from a separate HeCd laser with a wavelength of 4416 angstroms. The erase beam was passed through a mask bearing the desired spatial information and imaged into the pumped region of the PCM crystal. Resolution measurements were made using an Air Force resolution chart or Ronchi grating. A resolution of 40 lines per millimeter was observed.

To minimize the effects of diffraction and crosstalk, a compact cavity geometry was used which employed a flat output coupler placed 1.3 cm. from the PCM crystal. For this geometry image elements as small as 50 microns were resolved without cross-talk due to diffraction. Diffraction effects can be further reduced by replacing the output coupler with a second PCM. Characterization measurements were performed with a mask containing an array of four partially transmitting dots (or a single partially transmitting dot) on a clear background. The ratio of erase beam to pump beam intensity was set so that the single dot was just below the threshold level. The single dot was then replaced with an array containing four image elements with the same neutral density. The four-element array remained below threshold across its entire area, thus verifying the absence of diffractive cross-talk. When a mask with four dots of differing neutral density was used, one dot was below threshold (as predicted from the single-dot experiment), but the other three dots, with lower (and differing) transmission, all oscillated with nearly equal intensity. In experiments designed to test the memory properties of the device, the erase beam was turned off and the output of the PCR monitored. The PCR continued to display the spatial information contained in the erase beam for several seconds.

The invention lends itself to numerous optical data processing applications. It can be used to determine when the optical intensity of any single pixel or group of pixels exceeds a prescribed but controllable threshold over a field of 10,000 pixels or more. Some applications for this high resolution capability include the detection of a convolution or correlation output, enhancement of an input beam's signal-to-noise ratio, incoherent-to-coherent conversion and contrast or image reversal and enhancement.

Numerous modifications and alternate embodiments will occur to those skilled in the art. For example, the term "optical" as employed herein is intended to be taken in its broad sense as applying to any wavelength at which a laser is capable of operating, not just the visible spectrum. Thus, it is intended that the invention be limited only in terms of the appended claims.

We claim:

1. An optical intensity threshold detector for an optical input erase beam having a spatial intensity pattern, comprising:
    a phase conjugate resonator (PCR) comprised of a phase conjugate mirror (PCM), a mirror means optically opposed to the PCM and an oscillation cavity between the PCM and mirror means, the PCR having a greater than unity gain,
    the PCM being adapted to receive the erase beam and having a conjugating medium whose local reflectivity decreases with increasing erase beam local intensity, the PCR producing a high intensity spatial optical output at locations corresponding to the locations of the erase beam having an optical intensity below a threshold level, and a low intensity output at locations corresponding to the locations of the erase beam having an optical intensity above said threshold level, and
    an optical detector means for sensing the PCR output.

2. The optical intensity threshold detector of claim 1, wherein the PCM is a degenerate four-wave mixing device which includes means for forming a pair of counter-propagating pump beams, and the PCM is adapted to receive the erase beam generally parallel to the PCR axis.

3. The optical intensity threshold detector of claim 2, wherein the pump beams are generated with beam powers in the same order of magnitude as the erase beam power.

4. The optical intensity threshold detector of claim 2, wherein the erase beam is non-interfering with respect to the pump beam.

5. The optical intensity threshold detector of claim 1, wherein the PCM has a photorefractive conjugating medium.

6. The optical intensity threshold detector of claim 1, wherein the detector means comprises means for sensing the spatial optical output from the PCR.

7. The optical intensity threshold detector of claim 1, wherein the detector means comprises means for sensing the cumulative area optical output from the PCR.

8. The optical intensity threshold detector of claim 1, the PCM having a conjugating medium with a reflectivity greater than unity.

9. The optical intensity threshold detector of claim 1, the PCM having a conjugating medium with a reflectivity less than unity, and further comprising a gain medium in the oscillation cavity to elevate the PCR gain above unity.

10. The optical intensity threshold detector of claim 1, further comprising a lens adapted to image the erase beam onto the PCM.

11. A method for detecting the spatial portions of an optical input beam which exceed a predetermined optical intensity threshold level, comprising:
    directing the beam as an erase beam onto the phase conjugate mirror (PCM) of a phase conjugate resonator (PCR) to excite a spatially distributed oscillation therein which spatially corresponds with the portions of the beam below the threshold level, and detecting the PCR oscillation pattern.

12. The method of claim 11, the PCR including a degenerate four-wave mixing phase conjugate mirror (PCM) having a pair of counter-propagating pump beams, wherein the erase beam is directed onto the PCM generally parallel to the PCR axis.

13. The method of claim 12, wherein the pump beams are generated to be substantially non-interfering with the erase beam in the PCM.

14. The method of claim 11, wherein the PCR oscillation pattern is detected by sensing its spatial optical output.

15. The method of claim 11, wherein the PCR oscillation pattern is detected by sensing its cumulative area optical output.

16. An optical intensity memory device for retaining spatial information on the locations of an optical erase beam having an optical intensity below a threshold level, comprising:
   a phase conjugate resonator (PCR) comprised of a phase conjugate mirror (PCM), a mirror means optically opposed to the PCM and an oscillation cavity between the PCM and mirror means, the PCR having a greater than unity gain and a predetermined response time,
   the PCM being adapted to receive the erase beam and having a conjugating medium whose local reflectivity decreases with increasing erase beam local intensity, the PCR producing a high intensity spatial optical output at locations corresponding to the locations of the erase beam having an optical intensity below a threshold level, and a low intensity output at locations corresponding to the locations of the erase beam having an optical intensity above said threshold level, the PCR retaining said output for a memory period approximately equal to the response time after removal of the spatial information from the erase beam applied to the PCM, and
   an optical detector means for sensing the PCR output.

17. The optical intensity memory device of claim 16, further comprising means for blocking the erase beam to remove the spatial information applied to the PCM.

18. The optical intensity memory device of claim 16 wherein the PCM is a degenerate four-wave mixing device which includes means for forming a pair of counter-propagating pump beams, and the PCM is adapted to receive the erase beam generally parallel to the PCR axis.

* * * * *